April 8, 1958 L. B. HAMSHAW 2,829,550
MAGAZINE FED HAND TOOL FOR APPLYING LEAD
WEIGHTS TO FISHING LINES
Filed Aug. 21, 1956 2 Sheets-Sheet 1
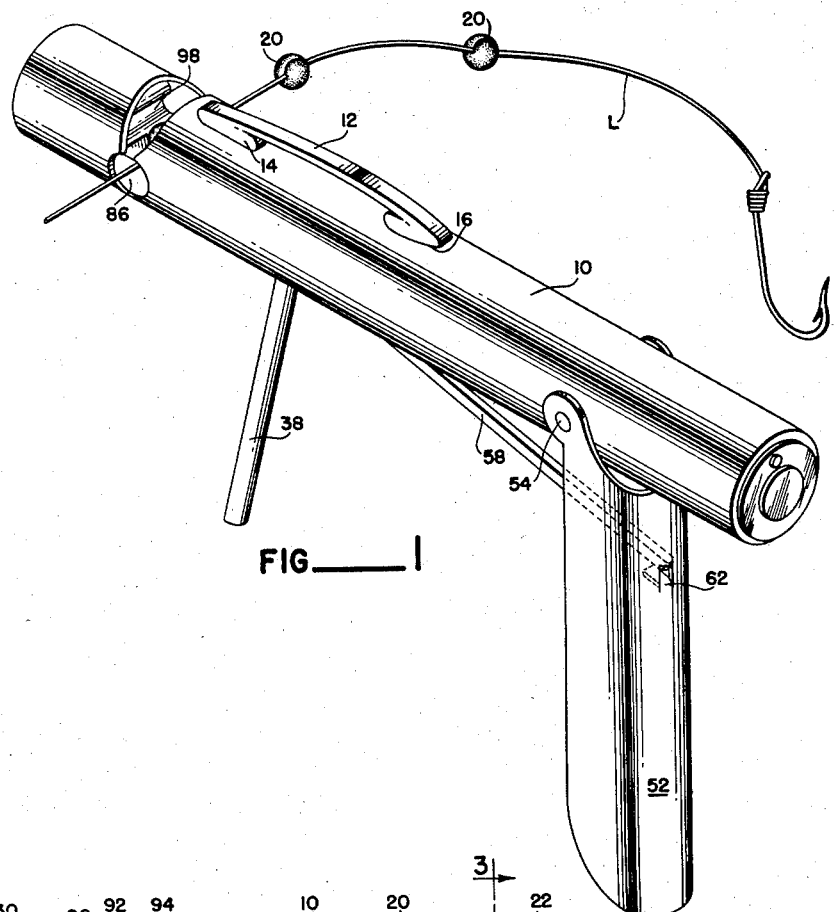
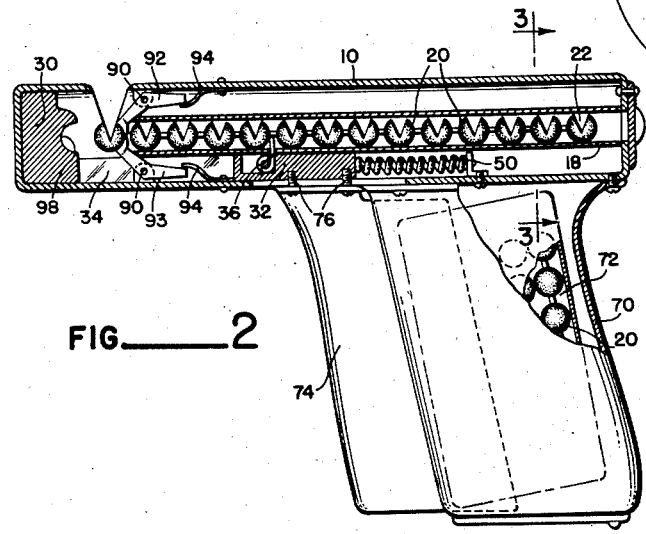
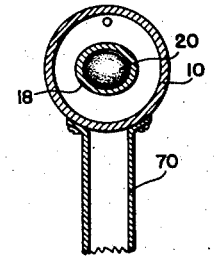
LEONARD B. HAMSHAW
*INVENTOR.*
BY *Smith & Tuck*

April 8, 1958 L. B. HAMSHAW 2,829,550
MAGAZINE FED HAND TOOL FOR APPLYING LEAD
WEIGHTS TO FISHING LINES
Filed Aug. 21, 1956 2 Sheets-Sheet 2
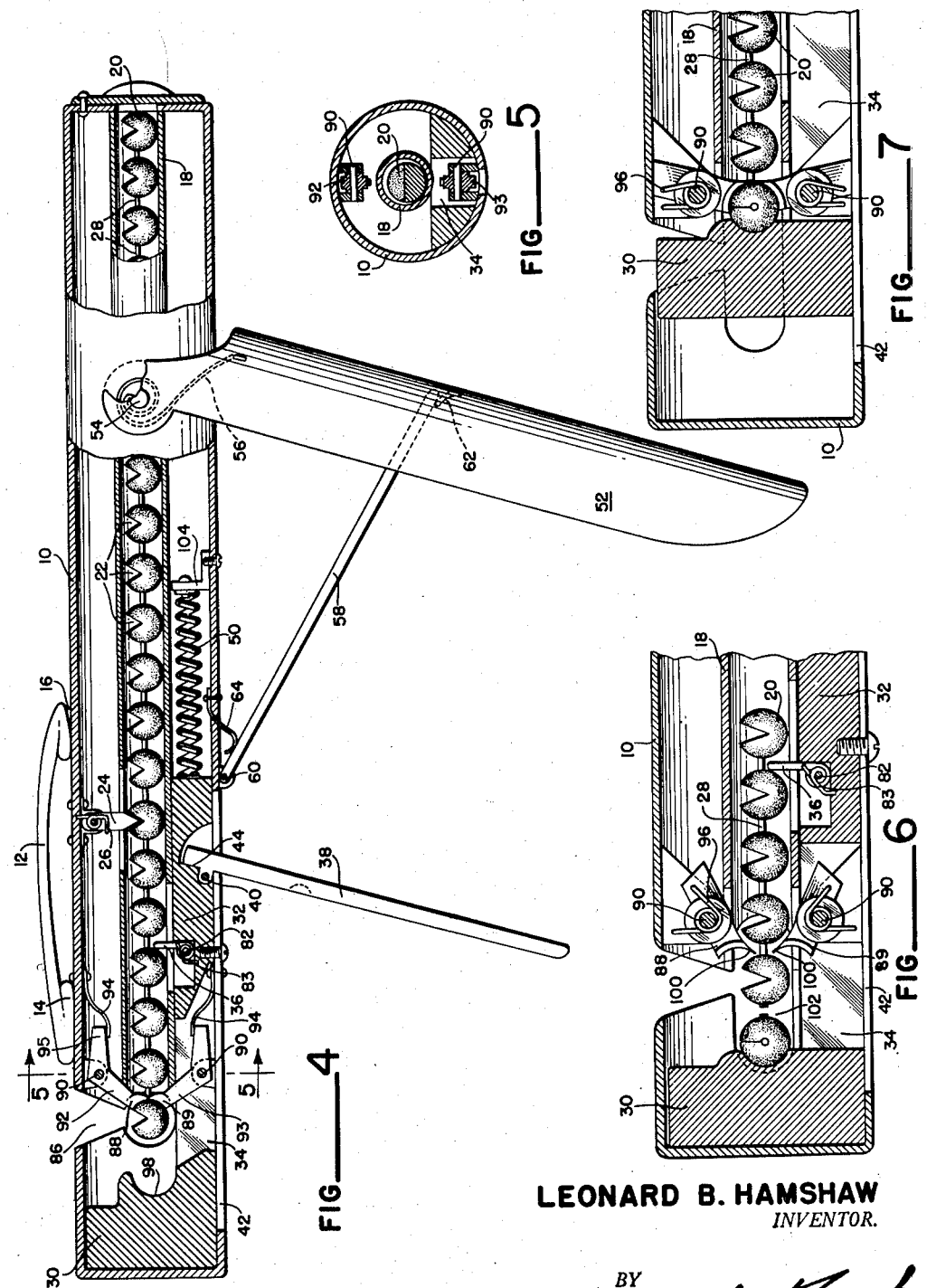
LEONARD B. HAMSHAW
*INVENTOR.*
BY
*Smith & Tuck*

United States Patent Office 2,829,550
Patented Apr. 8, 1958

2,829,550

MAGAZINE FED HAND TOOL FOR APPLYING LEAD WEIGHTS TO FISHING LINES

Leonard B. Hamshaw, Seattle, Wash.

Application August 21, 1956, Serial No. 605,284

7 Claims. (Cl. 81—15)

This present device is arranged to provide convenient storage for a plurality of fishline weights such as are normally referred to as "split shot." Means are further provided for sequentially feeding single shot or weights forwardly to a point that is slotted, to the end that a fishline or the selvaged edge of a piece of material may be inserted therein. Means are further provided so that adequate pressure can be easily applied to close the split shot on the fishing line or the fabric which is to be weighted along one margin.

Split shot is more generally used as fishing weights than any other form of sinker. This is due to the fact that it is cheap; that it secures to the line without damage to the line; and that, in a manner, it is less apt to be the cause of the line being snagged on the bottom and the like than the elongated conventional form of sinker. Split shot occurs in many sizes, and quite often the fisherman will apply several of these shot at spaced intervals along his fishing leader or line; or he may group a number of them together. The fact that his is applying a number of weights gives him a wide latitude in selecting the total weight that seems best suited to the purpose of the moment. Considerable annoyance is occasioned many times by the fact that split shot are normally carried in a container of some kind, which must be opened and the shot selected, then the same must be applied as to the fishline and then crimped or swedged tight on the line. This may be done by biting them with one's teeth, or pliers may be used; in fact, in almost any fishing group it is surprising to see the number of different ways people find to close the shot on the line.

In my present device I have endeavored to provide not only storage for split shot but also a convenient means of attaching the same to a fishline in which it is unnecessary to work with the tips of the fingers, as on a cold day, but this device can be used with mittens or gloves on and will make a uniform attachment of the weights to the line with certainty and very quickly.

The principal object, therefore, of my present invention is to provide a conveniently portable device for applying lead shot to fishlines and to the margins of sheet or woven materials.

A further object of my present invention is to provide a weight-applying device which stores a plurality of weights and feeds them forward in order to have one accurately positioned for each weight-attaching cycle.

A further object of my present invention is to provide a carrying chamber for shot and an attaching means whereby the shot can be applied to the fishing line and to have the same made in a very compact form, so that it can be carried in the pocket normally much as a fountain pen is carried.

A further object of the present invention is to provide a convenient means of attaching a lead weight to a margin of a piece of fabric so as to weight the same, as is so often done with curtains, dress goods and the like.

Further objects, advantages and capabilities will be apparent from the description and disclosure in the drawings, or may be comprehended or are inherent in the device.

In the drawings:

Figure 1 is a perspective view showing one preferred form of my device, the same being shown on a scale approximately twice its normal size.

Figure 2 is a vertical longitudinal sectional view of a modified form of my device.

Figure 3 is a cross-sectional view taken along the line 3—3 of Figure 2.

Figure 4 is a longitudinal sectional view, on an enlarged scale, showing my device in its operational position and showing the same as fully charged with fishing weights.

Figure 5 is a cross-sectional view taken along the line 5—5 of Figure 4.

Figure 6 is a fragmentary sectional view showing the shot-applying end of my device and illustrating a minor modification of the jaw members employed in fixing the shot and cutting it free from the interconnecting link joining it to the balance of the shot charge.

Figure 7 is a vertical sectional view similar to Figure 6, but showing the completion of a cycle which is about to start in Figure 6.

Referring more particularly to the disclosure in the drawings, the numeral 10 designates the housing which stores the split shot and also houses the principal portions of the mechanism which affixes the shot to the fishing line or the like. The housing is preferably cylindrical, as this normally is the cheaper form of tubing, and also lends itself to the simulation of a fountain pen or the like for easy carrying in the pocket. To the end of assisting in the convenient carrying of the device, I have provided a clip as 12, which is anchored to housing 10 as at 14 and is free of the same or merely touching under spring urgence at 16. This device may take on any of the various forms of fountain pen clips, which are normally associated with pens or pencils to retain them in the pocket of the owner.

Disposed along the axis of housing 10 is preferably a second tube, as 18, which is of a size and shape to accommodate a plurality of fishing weights 20. Attention is invited to the fact that two forms of these weights are shown: the spherical form in Figure 5; and the oval form in Figure 3. With the oval form, it of course will be readily apparent that the various shot will all be oriented so that the open V or slit 22 is uppermost, which is the convenient way of handling it in the attaching cycle. In using the spherical form, which is the more commonly used type and probably would not be subject to the prejudice of the fisherman against possibly the oval form, this form needs additional orienting means so as to always present the open V 22 uppermost. One satisfactory method of obtaining this orientation is to provide a V-shaped orienting dog 24, which is spring-urged as by torsion spring 26, one end of which is anchored in the housing 10 and the other wraps or hooks around the dog.

It has been found most convenient to employ the split shot in bar form, in which a plurality of the shot are each interconnected by means of connecting lead bars 28. These bars can be given sufficient cross-section to insure that all the split shot will be oriented in the same manner, and thus will dependably present the V-opening for engagement with the fishing line or cloth to which the weight is to be attached.

As each successive shot is applied to the fish-line, for instance, the mechanism advances the whole string of interconnected shot one shot-space, and in so doing the point of the orienting dog 24 is moved to the left, as viewed in Figure 4, and it becomes disengaged from one V 22 and will then normally drop in between the two shot and engage bars 28, at which time it has a chance to correct any lack of orientation, and then it will be cammed up over the leading edge of the next shot and finally will be snapped into position in the V, after the showing of Figure 4, and in so doing will put pressure on the portion of the slot which is uppermost, as in canting, and in this way any lack of orientation will be successively corrected with each forward movement of the shot.

The movable anvil 30 is disposed for limited reciprocation within the confines of housing 10 and has additionally secured to it the abutment member 32. Ordinarily these parts are made as one unit and slotted as at 34, so as to give operational space for the jaw members and the weight- or shot-translating dog 36. In the form of the device which conforms somewhat to the general appearance of a fountain pen, I provide an operating lever or trigger 38 which is pivoted at 40 to member 32; and in the carrying position this trigger lies against the body of housing 10 with a portion of it enshrouded in slot 42. In the operating position the upper end of trigger 38 comes to rest on an abutting surface at 44, so that, as force is applied to the forward or left-hand face of trigger 38, particularly as viewed in Figures 1 and 4, the trigger is in effect a fixed member and a component of the movable anvil assembly. Consequently, as force is applied to the trigger, the entire anvil assembly will be moved rearwardly or to the right, as viewed in Figure 4, against the compression spring 50.

In order to have a reacting surface, so that the force for the operation of this device can be obtained by the thumb and fingers of one hand, as in gripping, I have provided a handle 52. This handle is pivoted on the outside of housing 10 by diametrically opposed detents or pivot members 54; and, further, a torsion spring 56 is provided, which normally tends to close the handle up against housing 10. During the operational cycle, however, this movement is prevented by the strut member 58 which is pivoted at 60 to the housing and is free to engage handle 52 until it comes up against a stop 62. Strut 58 is under urgence of spring 64; consequently, for all operational purposes, handle 52 is fixed to housing 10 against rotation when force is applied to the operating lever or trigger 38 with the fingers and thumb spanning the trigger and handle during the squeezing operation.

In the modified form of my device, as shown in Figures 2 and 3, instead of having the device follow the general form of a fountain pen, I have elected to also show it as though it were a small automatic pistol. In this form handle 70 is provided, which is fixedly secured to housing 10, and, as the handle is U-shaped in cross-section, it provides a storage compartment 72 for additional strips of the interconnected lead weights 20. Additionally, the U-shaped construction provides for receiving member 74 as it is moved, to the right as viewed, during the operational cycle. The operational energy is supplied similarly to the form of Figures 1 and 4, in that a trigger unit 74 is fixedly secured, as by a plurality of screws 76, directly to the movable anvil assembly, and more specifically to member 32 thereof. A slot is provided in housing 10 for the reciprocation of screws 76; consequently squeezing the grip and trigger assembly will move the anvil unit against the compression spring 50, as in the former construction. It is desirable to point out that the housings and principal operating parts in both forms of this device are to all intents and purposes identical.

In order to provide sequential operation, so that each of the plurality of lead weights can be moved into position for attachment to the fishline or the like, I have provided a partially revolvable dog 36 which is pivoted at 82 to member 32 and, of course, reciprocates with it. This dog is provided with preferably a torsion spring 83 and, as the column of weights is held by the jaw members, dog 36 revolves against its torsion spring and slips under the next succeeding weight until it is far enough beyond the same so that it can hinge up into the operational position shown in Figures 2, 4 and 6 and provide for the translating of the shot strip.

I provide in the forward end of housing 10 a transverse keyhole-shaped slot 86, to the end that the fishing line, as L, may be passed through the slot and by the tapering sides be directed to the V 22 of the weights 20.

Disposed on the medial plane passing through the centers of weights 20, are the centers of the jaw members 88 and 89. These are pivotally mounted upon pivots 90, which are secured in housing 10. It will be noted that two forms of the jaw members are shown: that indicated in Figures 2 and 4; and the modified form in Figures 6 and 7. The choice between these different forms is one dealing with the size of the maximum weights to be used and the maximum dimensions of the device itself. In the form shown in Figures 2 and 4, these jaw members have been given the reference characters 92 and 93, respectively. However, their functioning is identical with the form shown in Figures 6 and 7. The matter of mounting of the spring is different, in that the forms shown in Figures 2 and 4 use a leaf spring, as 94, which engages an end extension, as 95, of the jaw members which in this modification are given the form of a bell crank. In the forms shown in Figures 6 and 7, on the other hand, torsion springs wrapped around the pivot axis 90 are employed, with one end of the spring anchored to the jaw member itself and the other anchored to the housing. In all cases, however, the urgence of the respective springs, whether the flat springs 94 or the torsion springs 96, is to urge the two jaws into the median line of the device, and this means that the jaws will be cammed over the advancing lead weights by means of the weight itself abutting the jaw members.

In the functioning of this device the operator grips the handle and the trigger mechanism in one hand, just as a gun would be gripped; and then, by squeezing operating lever 38 or in the modified form, trigger 74, the block 32 and anvil assembly 30 are moved to the right, as viewed in the drawings. This brings the weight seat 98 into engagement with the lead weight, which is held in position by the toggle action of the jaw members; and, as soon as the line has been seated in slot 86 and into the V 22, the anvil member 30 is continued in this movement to the right until it comes into firm abutment with the weight, and then a continued pressure swedges the weight to its original form substantially and in closing secures the weight to the leader fishline or the margin of a piece of fabric if it is so used. Near the completion of the swedging cycle the cutting points, as 100, of the jaw members sever the connecting bar 28, and the attached weight is then detached from the weight bar and can then be moved sideways out through opening 102, and the cycle is complete. As the movement of the anvil assembly 30 has been against the compression spring 50 and this spring has an abutment as 104, which is fixedly secured to housing 10, the end result, as soon as pressure is released, is for spring 50 to take over the operation and restore the anvil assembly to its fully open position, after the showing of Figures 2, 4 and 6. As this is taking place the orienting dog, in the form shown in Figure 4, is repositioned into the V 22 of the next-in-line weight and the translating, pivoted dog 36 has been passed under one of the weights so that it may engage the rear or the right-hand side of the same, as viewed. This same sequence of operation has moved the entire column of lead weights so that a new weight is positioned on the vertical axis of slot 86 all ready for the re-cycling of the operation. As in all small and simple devices, the detailed description of its functioning takes a great deal longer than the actual manipulation of the device. In this particular instance it is possible to apply lead weights to a fishline just as frequently as the hand can be fully gripped so as to move the operational lever or triggers and to release the same, thus completing one cycle. The device will be found to be a great aid in applying weights to fishlines, which is most especially appreciated during times of cold weather and the like when the fingers may have lost some of the their dexterity due to cold, mittens, gloves and the like.

It is believed that it will be clearly apparent from the above description and the disclosure in the drawings that the invention comprehends a novel construction of fishline shotgun.

Having thus disclosed the invention, I claim:

1. A device for attaching split lead weights to a line or the edge of sheet material, comprising: a tubular housing; an elongated weight storage chamber adapted to receive a plurality of weights which are joined by interconnecting bars of lead; means for maintaining said lead weights in proper orientation to present their split or notched portions to the material to be weighted; a pivotally-mounted pair of jaws, each provided with a cutting edge, adapted to successively engage the rear side of each lead weight in a supporting manner; resilient means for each jaw disposed to permit the jaw to pass over each successive weight and to then position the jaw in holding relationship thereto; a handle for grasping the device and giving the operator's hand a firm base for applying the operating energy required during each cycle of operation; a movable anvil member slidable within said housing to engage the opposite side of the lead weight, during the swedging cycle, and to coact with said jaws; operating means connected to said anvil member for sliding the same and disposed, with respect to said handle, so the operating energy to complete the cycle may be applied by one hand; said anvil, near the end of the swedging cycle, causing the cutting edges of said jaws to engage and sever the lead bar secured to the swedged lead weight; and means for withdrawing the anvil from engagement with the lead weight and operating a spring-backed pawl to advance a new lead weight in position for the next succeeding cycle of operation.

2. A device for attaching split lead weights to a line or the edge of sheet material, comprising: a tubular housing; an elongated weight storage chamber adapted to receive a plurality of weights which are joined by interconnecting bars of lead; means for maintaining said lead weights in proper orientation to present their split or notched portions to the material to be weighted; a pair of pivoted jaws each provided with a cutting edge, mounted in said housing and adapted to successively engage the rear side of each lead weight in a supporting manner; resilient means for each jaw disposed to permit the jaw to pass over each successive weight and to then position the jaw in holding relationship thereto; a handle for grasping the device and giving the operator's hand a firm base for applying the operating energy required during each cycle of operation; a movable anvil member slidable within said housing to engage the opposite side of the lead weight, during the swedging cycle, and to coact with said jaws in the weight swedging and bar cutting operation; operating means connected to said anvil member for sliding the same and disposed, with respect to said handle, so the operating energy to complete the cycle may be applied by one hand; a spring-backed pawl adapted to engage successively the rear surface of each lead weight; and means for withdrawing the anvil from engagement with the lead weight and operating said spring-backed pawl to advance a new lead weight in position for the next succeeding cycle of operation.

3. A device for attaching split lead weights to a line or the edge of sheet material, comprising: a tubular housing; an elongated weight storage chamber adapted to receive a plurality of weights; means for maintaining said lead weights in proper orientation to present their split or notched portions to the material to be weighted; a coacting pair of jaws, pivotally mounted in said tubular housing, adapted to successively engage the rear side of each lead weight in a supporting manner; resilient means for each jaw disposed to permit the jaw to pass over each successive weight and to then position the jaw in working relationship; a handle for grasping the device and giving the operator's hand a firm base for applying the operating energy required during each cycle of operation; a movable anvil member slidable within said housing to engage the opposite side of the lead weight, during the swedging cycle, and to coact with said jaws; operating means connected to said anvil member for sliding the same and disposed, with respect to said handle, so the operating energy to complete the cycle may be applied by one hand; and means for withdrawing the anvil from engagement with the lead weight and operating a spring-backed pawl to advance a new lead weight in position for the next succeeding cycle of operation.

4. The subject matter of claim 1, in which said orienting means comprises: a pawl pivotally secured to said housing and having a wedge-shaped point adapted to successively engage the V-slit in each split-shot; spring-positioning means for said pawl assuring that the pawl is at right angles to the line of travel of the weights after it has been cammed out of position by the passage of the shot beneath the pawl.

5. The subject matter of claim 1, in which the operating means for the anvil member comprises: a lever pivoted to said anvil member in such a manner as to lie against and parallel to said housing during the carrying or storage of the device and adapted to have its long end swing away from said housing until the short end engages an abutment formed in said anvil member.

6. The subject matter of claim 1, in which the handle for grasping the device is pivoted to the outer surface of said housing and is interiorly curved to fit said housing when it is in the carrying or storage position and having a stop interiorly disposed; spring means disposed to continuously urge said handle into engagement with said housing; a strut pivotally secured to said housing and spring-urged to move its free end away from said housing and into engagement with the stop inside said handle.

7. The subject matter of claim 3, in which said handle is U-shaped in cross-section and fixedly secured to said housing and provided with an interior storage chamber for pre-formed split-shot bars; and an operating means for and secured to said anvil member, disposed to move partially into the open side of said U-shaped handle during the swedging cycle.

References Cited in the file of this patent

UNITED STATES PATENTS

| | | |
|---|---|---|
| 2,651,958 | Deline | Sept. 15, 1953 |
| 2,723,403 | Miller | Nov. 15, 1955 |
| 2,765,686 | Deline | Oct. 9, 1956 |
| 2,765,687 | Stanfield | Oct. 9, 1956 |